United States Patent [19]
Ripstein

[11] Patent Number: 6,145,196
[45] Date of Patent: Nov. 14, 2000

[54] METHOD OF MAKING A PAINT ROLLER WITH NON-PLASTIC BASE MATERIAL

[76] Inventor: Jorge Ripstein, Calle 4 No. 32, Naucalpan Edo de Mexico 53370, Mexico

[21] Appl. No.: 09/439,710

[22] Filed: Nov. 12, 1999

Related U.S. Application Data

[63] Continuation-in-part of application No. 09/034,595, Mar. 3, 1998.

[51] Int. Cl.[7] .............................. B21D 53/00; B21K 1/02
[52] U.S. Cl. .................... 29/895; 29/895.21; 29/DIG. 1; 29/527.2; 156/187; 156/29
[58] Field of Search ............................ 29/DIG. 1, 527.2, 29/895, 895.2, 895.21; 15/230.12, 230.13; 118/257, DIG. 11; 156/187, 188, 189; 492/29, 43, 44, 52; 427/195

[56] References Cited

U.S. PATENT DOCUMENTS

| | | | |
|---|---|---|---|
| 2,411,842 | 12/1946 | Adams | 15/27 |
| 2,789,075 | 4/1957 | Stahl | 154/83 |
| 2,806,803 | 9/1957 | Thackara et al. | 117/17 |
| 2,948,200 | 8/1960 | Westerbarkey | 93/80 |
| 3,126,306 | 3/1964 | Sherman | 156/187 |
| 3,226,799 | 1/1966 | Grodberg et al. | 29/120 |
| 3,366,719 | 1/1968 | Lueders | 264/47 |
| 3,429,522 | 2/1969 | Cunningham et al. | 242/118.32 |
| 3,430,543 | 3/1969 | Cummingham | 93/94 |
| 3,457,130 | 7/1969 | Morrison | 156/190 |
| 3,518,970 | 7/1970 | Burns et al. | 118/640 |
| 3,607,492 | 9/1971 | Keith et al. | 156/79 |
| 3,620,869 | 11/1971 | Stump et al. | 156/190 |
| 3,700,520 | 10/1972 | Hielema | 156/162 |
| 3,761,335 | 9/1973 | Cichoski et al. | 156/187 |
| 3,960,624 | 6/1976 | Erlandson | 156/189 |
| 4,010,054 | 3/1977 | Bradt | 156/173 |
| 4,078,957 | 3/1978 | Bradt | 156/173 |
| 4,192,697 | 3/1980 | Parker et al. | 156/188 |
| 4,692,975 | 9/1987 | Garcia | 29/120 |
| 5,137,595 | 8/1992 | Garcia | 156/425 |
| 5,195,242 | 3/1993 | Sekar | 29/895.21 |
| 5,206,968 | 5/1993 | Bower et al. | 15/230.11 |
| 5,273,604 | 12/1993 | Alvarez Garcia | 156/187 |
| 5,397,414 | 3/1995 | Garcia et al. | 156/187 |
| 5,398,409 | 3/1995 | Sekar | 29/895.21 |
| 5,572,790 | 11/1996 | Sekar | 29/895.211 |
| 5,855,715 | 1/1999 | Langford et al. | 156/187 |
| 5,862,591 | 1/1999 | Kulkaski | 29/895.2 |

*Primary Examiner*—David P. Bryant
*Assistant Examiner*—Jermie E. Cozart
*Attorney, Agent, or Firm*—Welsh & Katz, Ltd.

[57] ABSTRACT

A method of manufacturing a paint roller includes the steps of providing at least one strip of non-plastic base material, applying a coating of partially melted plastic to at least one side of the strip of material prior to winding the strip about a mandril, winding the strip of material, after application of the partially melted plastic thereto, about the mandril in a spiral manner, the partially melted plastic causing the strip of material to bond forming a core, and winding a strip of fabric material about the core in a spiral manner, the partially melted plastic material applied to the base strip prior to winding causing the fabric material to bond to the core forming the paint roller.

10 Claims, 4 Drawing Sheets

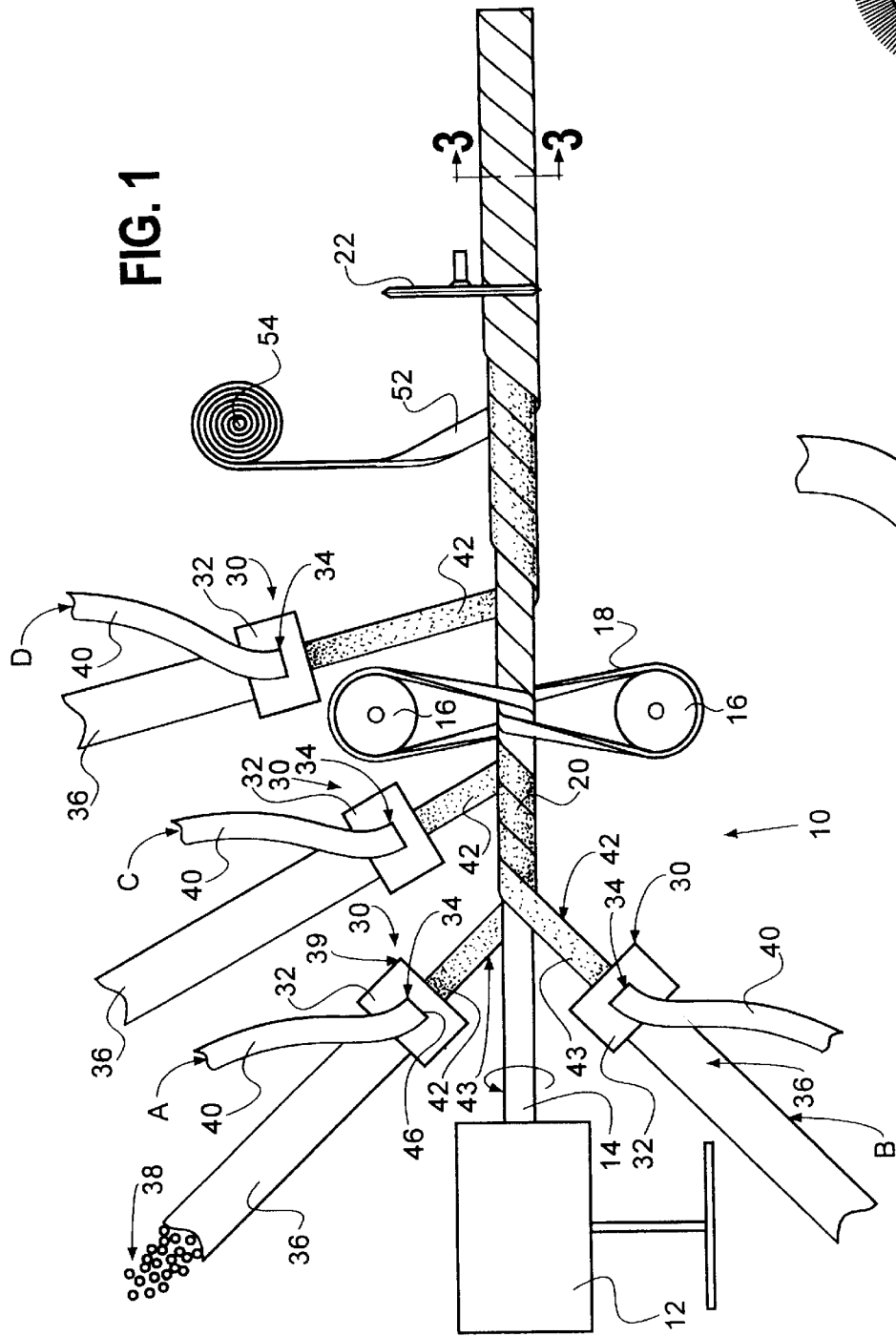
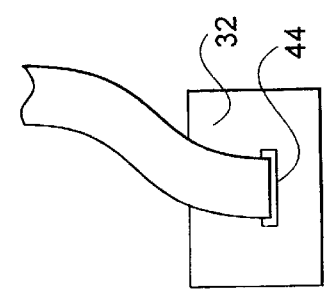
FIG. 1
FIG. 2
FIG. 3

METHOD OF MAKING A PAINT ROLLER WITH NON-PLASTIC BASE MATERIAL

CROSS REFERENCE TO RELATED U.S. APPLICATIONS

This is a continuation-in-part of Ser. No. 09/034,595 filed Mar. 3, 1998 entitled Method Of Making A Paint Roller With Non-Plastic Base Material.

BACKGROUND OF THE INVENTION

The present invention relates generally to a method and apparatus for manufacturing reusable paint rollers.

Paint rollers are frequently used by professional painters and non-professional painters to apply a layer of paint to walls, ceilings, and other surfaces. Paint rollers increase the painter's efficiency by permitting the paint to be applied much more rapidly than is possible by using a conventional paint brush.

Paint rollers typically include a core and a paint absorbing outer fabric layer or cover. The core may be solid preformed stock material, or may be wound from one or more strips of base material. An example of a known paint roller is disclosed in U.S. Pat. No. 4,692,975 issued to Garcia. Garcia uses a core comprised of a preformed tube of solid thermoplastic material. A moveable platform applies a continuous strip of fabric to the rotating core. The core is partially melted just prior to application of the fabric material such that the fabric becomes permanently bonded to the core. However, this technique is expensive, as preformed stock material is required.

Another example of a known paint roller is disclosed in U.S. Pat. No. 5,572,790 issued to Sekar. Sekar discloses using multiple strips of thermoplastic material, which are wound about a stationary mandril to form a core. Once the core is formed, additional liquid thermoplastic material is applied to the core to act as an adhesive to bond the fabric material to the core, which is then also wound about the core. However, Sekar has several disadvantages. Liquid thermoplastic material must be applied to the core from one or more feed nozzles, or other type of device capable of accurately applying the liquid "adhesive." It is difficult to accurately regulate the application of liquid thermoplastic material from the application nozzle to the rotating core. Such nozzles often clog, thus causing the manufacturing process to be temporarily halted until the nozzle is cleaned. Additionally, such a process is expensive because the multiple nozzle system is costly to operate and maintain. Several such nozzles must be used if multiple strips of material are wound to form the core. Typically, one application nozzle is used for each strip of base material, in addition to one nozzle for applying the liquid thermoplastic material to the fabric strip.

In Sekar, the base material that forms the core is made of strips of thermoplastic material, such as polypropylene. Cores formed of only thermoplastic strips of material tend to be weaker than cores formed of other material, such as metal and cardboard strips, thus the useful life of such paint rollers is relatively short.

Accordingly, it is an object of the present invention to provide a novel method of making a paint roller to substantially overcome the above-described problems.

It is another object of the present invention to provide a novel method of making a paint roller that does not use thermoplastic strips as the base material from which to form the core.

It is a further object of the present invention to provide a novel method of making a paint roller that uses cardboard or metal strips as the base material for the core.

It is also an object of the present invention to provide a novel method of making a paint roller that does not require application of any adhesive or liquid thermoplastic material to the core once the core has been formed.

It is still an object of the present invention to provide a novel method of making a paint roller where cardboard or metal strips pass through an extruder that applies a layer of liquid thermoplastic material to the strips before the strips are wound to form the core.

It is another object of the present invention to provide a novel method of making a paint roller that uses a heating device to soften and partially melt a pre-manufactured strip of thermoplastic material so as to adhere it to the strips of base material.

SUMMARY

The disadvantages of present methods of making paint rollers are substantially overcome with the present invention by providing a novel method of making paint rollers having a core formed of non-plastic strips of material.

The present inventive method is more cost efficient and less complex than known methods of manufacturing paint rollers. In the present inventive method, liquid thermoplastic material is applied only at one point during the formation process. The liquid thermoplastic material is applied as the strip of non-plastic material exits the die head, and at no other point. No liquid thermoplastic material or adhesive is applied to the wound core at any point. Accordingly, additional liquid plastic applicators or nozzle systems are not required, which are expensive to operate and maintain. Because the liquid thermoplastic material is applied via an extruder device, which is inherently an "on-demand" type of machine, costs are reduced. The extruder device receives and melts plastic pellets on demand, or as needed. This is in contrast to known systems, which apply liquid plastic to the core at various points during the formation of the core. In such known systems, a reservoir or bath of liquid plastic must be maintained in a melted state regardless of the amount of liquid plastic required. This is costly because the entire reservoir of plastic must be maintained at a relatively high temperature, and must not be allowed to cool. Maintenance and operating costs for such known systems are higher than for the present inventive system.

One method of manufacturing a paint roller of one embodiment of the present invention includes the steps of providing at least one strip of non-plastic base material, applying a coating of liquid plastic to at least one side of the strip of the base material prior to winding the strip about a mandril, winding the strip of base material, after application of the liquid thermoplastic thereto, about the mandril in a spiral manner, the liquid thermoplastic causing the strip of base material to bond forming a core, and winding a strip of fabric material about the core in a spiral manner, the liquid thermoplastic material applied to the strip of non-plastic base material prior to winding causing the fabric material to bond to the core forming the paint roller.

Another method of manufacturing a paint roller of one embodiment of the present invention includes the steps of providing at least one strip of non-plastic base material, providing at least one strip of thermoplastic material, partially melting the at least one strip of thermoplastic material, applying the partially melted thermoplastic material to at least one side of the strip of non-plastic base material, prior to winding about a mandril, winding the strip of non-plastic base material, after application of the partially melted thermoplastic material thereto, about the mandril in a spiral manner, the partially melted thermoplastic material causing the strip of non-plastic base material to be bonded to subsequent spiral layers to form a core; and winding a strip of absorbent material about the core in a spiral manner, where the partially melted thermoplastic material applied to the strip of non-plastic base material prior to winding causes the absorbent material to bond to the core forming the paint roller.

BRIEF DESCRIPTION OF THE DRAWINGS

The features of the present invention which are believed to be novel are set forth with particularity in the appended claims. The invention, together with further objects and advantages thereof, may best be understood by reference to the following description in conjunction with the accompanying drawings.

FIG. 1 is a side elevational view of a specific embodiment of a device for making paint rollers particularly showing multiple strips of base material forming a core, and a strip of fabric applied over the core, according to the present inventive method;

FIG. 2 is a front view of an extruder die head, according to the present inventive method, taken along the line 2—2 of FIG. 1 in the direction generally indicated;

FIG. 3 is a sectional view of the paint roller, taken along the line 3—3 of FIG. 1 in the direction generally indicated;

DETAILED DESCRIPTION

Figure 4:
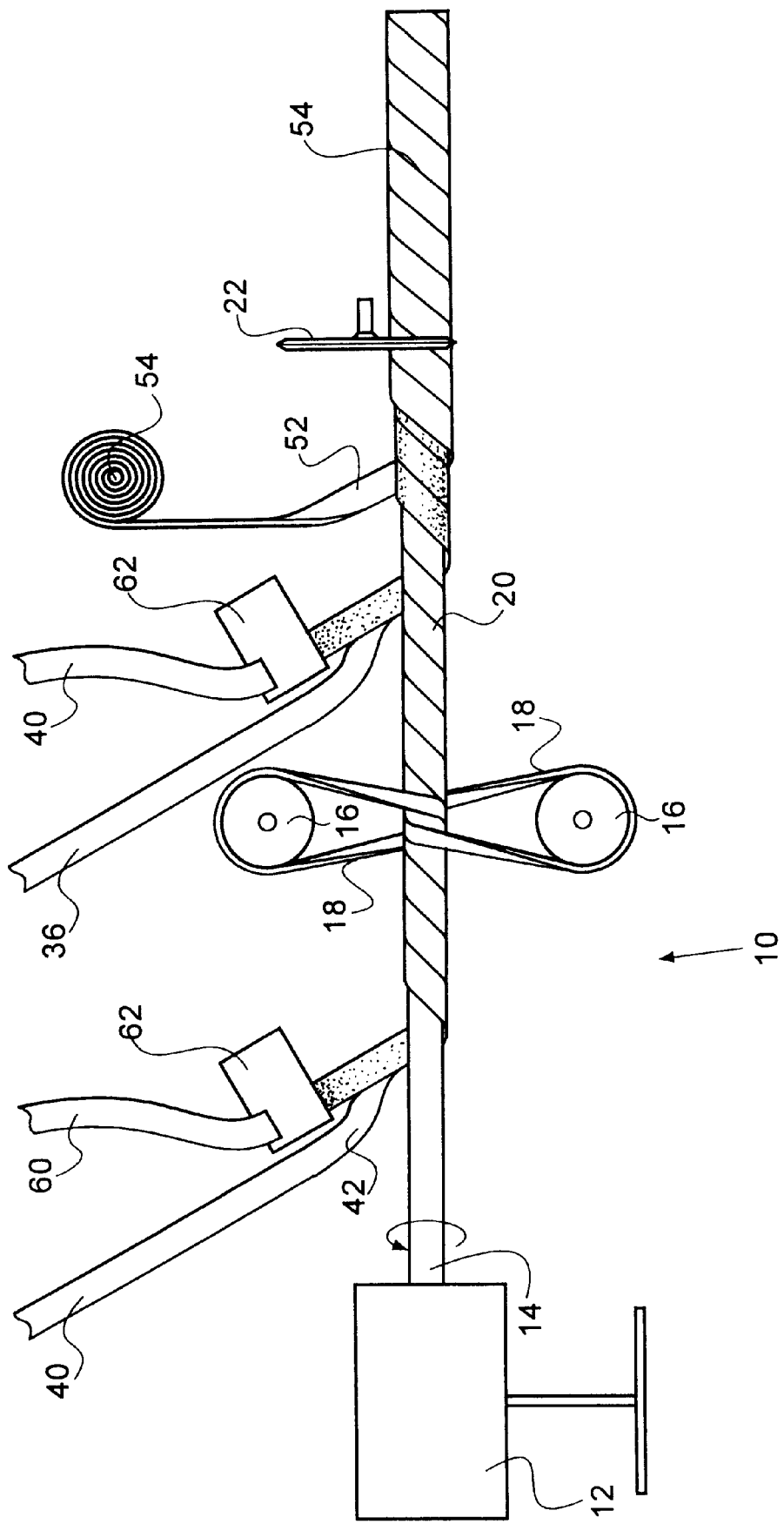
FIG. 4 is a side elevational view of a specific alternate embodiment of a device for making paint rollers particularly showing a heater/melter device for use with strips of thermoplastic material.

Referring now to FIG. 1, a roller forming apparatus for manufacturing paint rollers is shown generally as 10. The roller forming apparatus 10 utilizes many components of devices currently used to produce prior art paint rollers. The roller forming apparatus 10 includes a housing 12 to support a stationary mandril 14, and a pair of pulleys 16 coupled to one or more drive belts 18 that function to advance a wound strip of material along the stationary mandril to form a core 20. The pulleys 16 are powered by conventional means, as is known in the art. A "fly-away" cutter 22, shown in simplified form, cuts the core 20, which is otherwise endless, into useable lengths, as mandated by the particular manufacturing application. The forming apparatus 10 may be, for example, a model MS-8 Spiral Tube Cut-Off Saw with Mechanical Target Assembly or a Model SAR-42 Semi-Automatic Tube Recutter, both manufactured by Paco Winders Manufacturing, Inc.

The apparatus 10 includes one or more plastic extrusion devices 30, die head assembly front end 32 coupled to the extrusion device, and in-feed mechanism 34, which may be part of the die head assembly. The extrusion device 30 includes a heater tube 36, which receives a supply of granular plastic pellets 38 that are melted within the heater tube and are forwardly advanced within the tube by a screw-type mechanism. However, any suitable extruder mechanism may be used. As the plastic pellets 38 are advanced, the pellets are melted to form a liquid plastic material 39. Preferably, the plastic pellets 38 are a thermoplastic material, such as polypropylene or similar plastic.

The extrusion device 30 operates in conjunction with the in-feed mechanism 34 to feed a strip of base material 40 into the die head assembly 32. The base material may be, for example, strips 40 of cardboard, phenolic impregnated paper, chipboard, or thin metal. The base material strips 40 are commercially available and are provided in the form of a roll (not shown). The infeed mechanism 34 directs the strip of base material 40 into the die head assembly 32. When the strip of base material 40 enters the die head assembly 32, the melted thermoplastic material 39 is applied to one side 42 or both sides 42 and 43 of the strip of base material so that the strip is completely coated with the liquid polypropylene 39. In the illustrated embodiment of FIG. 1, only the strips of base material 40 labeled as "A" and/or "B" receive the liquid thermoplastic material 39 on both sides 42 and 43. The strip of base material 40 positioned just before the belts 18 and labeled as "C," would receive the liquid thermoplastic material 39 only on its underside 42 so as to prevent the liquid thermoplastic material from contacting the belts 18.

An advantage of the present inventive method is that the liquid thermoplastic material 39 is only applied at one point during the formation process—it is only applied as the strip of material 40 exits the die head. Once the strip of material 40 leaves the die head assembly 32 and extrusion device 30, no additional thermoplastic material 39 is applied to the surface of the core 20 or to the wound strips. This reduces costs and improves efficiency. Further, additional liquid plastic applicators or nozzle systems are not required, which are expensive to operate and maintain. Additionally, the extruder device 30 is inherently an "on-demand" type of device, which accepts and melts the plastic pellets 38 on demand, or as needed. In other words, only the amount of plastic demanded is melted. This is in contrast to known systems, which apply liquid plastic to the core at various points during the formation process. In such known systems, a reservoir or bath of liquid plastic must be maintained in a melted state regardless of the amount of liquid plastic required. This is costly because the entire reservoir of plastic must be maintained at a relatively high temperature and must not be allowed to cool. Maintenance and operating costs for such known systems are higher than for the present inventive system.

With respect to winding the strips of material 40, the strips of material 40 are fed and wound about the mandril 14 at an angle so as to form a spiral or helical pattern when wound. To begin the process, the free end of the strip of material 40, as supplied from the roll of material, is manually wound about the mandril 14 until it extends beyond the drive belts 18 so that the drive belts tightly surround the wound strips. When the drive belts 18 are engaged by the pulleys 16, the wound strip or core 20 is forwardly advanced along the mandril 14. The mandril 14 is formed of material or is coated with material so that the strips of material 40 do not "stick." The spiral pattern has sufficient overlap between spiral layers so that each "wrap" of the strip of material 40 bonds to adjacent wraps so as to form a strong core. The liquid thermoplastic 39 acts as an adhesive to bond the wraps of the strip of base material 40 together or to other strips of base material. Preferably, three strips of base material 40 are used, which may comprise, for example, any combination of strips of thin metal and strips of cardboard. Alternatively, multiple strips of cardboard alone may be used without the metal strips. The strips of thin metal may be made of tin or aluminum. As shown in FIG. 1, multiple extruder devices 30 or stations are arranged along the mandril 14, where each station is substantially the same.

Referring now to FIGS. 1–2, FIG. 2 shows an elevational view of the die head assembly 32. The die head assembly 32 has a rectangular aperture 44 through which the strip of material 40 exits. The strip of material 40 enters the die head assembly 32 through an aperture 46. The liquid thermoplastic material 39 is applied to the strip of material 40 when it is within the die head assembly 32, by conventional means, such as by rollers or applicator heads. Further, the rectangular aperture 44, in part, functions to regulate the thickness of the layer of liquid thermoplastic material 39 applied to the strip of material 40.

As the core 20 advances along the mandril 14, a strip of absorbent material, such as fabric 52 or other suitable material capable of absorbing and retaining paint, is wound about the formed core 20. The strip of fabric 52 is also provided in the form of a roll 54, which is initially started by manually wrapping the first length of the fabric strip about the mandril 14. It is important to note that no additional adhesive or liquid thermoplastic material 39 is applied to either the core 20 or the fabric strip 52. The temperature of the liquid thermoplastic material 39 applied to the strip of base material 40 as it exits the die head assembly 32 is sufficiently high so that the thermoplastic material remains in a semi-liquid or "tacky" state at the time that the fabric strip 52 is applied. This final strip of base material 40 and liquid thermoplastic material 39 shown as "D" is positioned after the belts 18. In this case, the thermoplastic material 39 is applied to both upper and lower surfaces 42, 43 of the base material strip 40 so that when the fabric strip 52 is applied over the tacky thermoplastic material 39, it becomes permanently bonded to the core 20 to form a finished paint roller 54. Thus, the liquid thermoplastic material 39 applied to the strip of base material 40 not only bonds the base material to form the core 20, but also bonds the fabric strip 52 to the core to form the paint roller 54. A push roller (not shown in this figure) may be used to press the fabric strip 52 against the core 20 to aid in forming a strong bond.

After the fabric strip 52 has been applied to and bonded with the core 20, the fly-away cutter 22 cuts the paint roller 54 into desirable lengths, as is known in the art. The position of the fly-away cutter 22 along the mandril 14 may be changed depending upon the length of paint roller manufactured. As shown in FIG. 3, the completed paint roller 54 is shown in a cross-sectional view.

Referring now to FIG. 4, a specific alternate embodiment is shown where like reference numerals are used to denote like structures. As described above with respect to FIGS. 1–3, a strip of base material 40, such as cardboard, chipboard, or thin metal, is provided in the form of a roll (not shown). A strip of thermoplastic material 60, such as polypropylene, is also provided in the form of a pre-manufactured roll, the width of which is approximately equal to the width of the base material strip 40. The strip of thermoplastic material 60 is fed into a heating unit 62 where it is softened by heat and partially melted. The heating unit 62 may be a commercially available heating device that preferably uses a flame to heat the strip of thermoplastic material 60 entering the unit. Alternately, the heating unit 62 may use electrical elements or heated air to accomplish the heating function. Again, as described above with respect to FIG. 1, the strip of base material 40 wound about the mandril 14 that is positioned immediately before the belts 18 receives the partially melted thermoplastic material only on the interior side 42 so that the belts do not contact the layer of partially melted thermoplastic material. The strips of base material applied to the mandril 14 positioned after the belts 18 preferably receive the partially melted thermoplastic material on the interior and/or exterior surfaces 42 and 43.

The strip of base material 40 may be transported by rollers or another suitable transport device (not shown) so that the strip of base material contacts the strip of partially melted thermoplastic material 60 shortly after the thermoplastic strip exits the heating unit 62. Alternately, depending upon the width of the strips of material used 40 and 60, the strip of base material 40 may not require any transport rollers or similar structure, and may simply be unreeled or pulled from its roll or coil as the mandril 14 rotates. As the thermoplastic strip 60 exits the heating unit 62, it is generally parallel to the base material strip 40 and may be positioned either directly above or directly below the base material strip, depending upon the number of heating units located prior to the belts 18. As shown in FIG. 4, only one heating unit 62 is shown prior to the belts 18. However, any number of heating units 62 may apply strips of partially melted thermoplastic material 60 to corresponding multiple strips of base material 40, as described with reference to FIG. 1.

The heating unit 62 provides sufficient heat to partially melt the thermoplastic strips 60 without causing the material to completely melt and become a liquid. Rather, it remains as a partially melted "tacky" strip of thermoplastic material 60. The thermoplastic strip 60 remains sufficiently tacky so that upon contact with the strip of base material 40, it adheres to it forming a bond with the strip of base material. The base material strip 40 with the partially melted thermoplastic material 60 is then wound around the mandril 14 such that the partially melted strip of thermoplastic material 60 bonds subsequent turns of the strip of base material 40 with the previous turns, thus forming the core of the paint roller 54. A structural lamination in the form of a spiral is formed because the overlapping spiral layers of material are bonded to each other.

Because the strip of thermoplastic material 60 is pre-cut with respect to its width, and is typically available in a variety of widths, application of the partially melted thermoplastic material 60 onto the base material strip 40 is very accurate. No spillage occurs and undesirable drips are eliminated. Such drips may cause irregularities on the wound surface or core 20. Application of the thermoplastic material 60 using the pre-manufactured roll of thermoplastic material in conjunction with the heating unit 62 can be controlled precisely because the thermoplastic material is not being applied from a reservoir of melted material.

Depending upon the roller size and application, the width of the base material strip 40 and thermoplastic strip 60 may vary. As the width of the materials used increases, use of premanufactured thermoplastic material 60 in the form of a roll becomes more advantageous because it is increasingly difficult to accurately apply pre-melted thermoplastic material to the base material strip 40 using an extrusion process, as described with respect to FIG. 1. Additionally, the heating unit 62 is cost efficient, and typically is less expensive than extruder devices.

Figure 5:
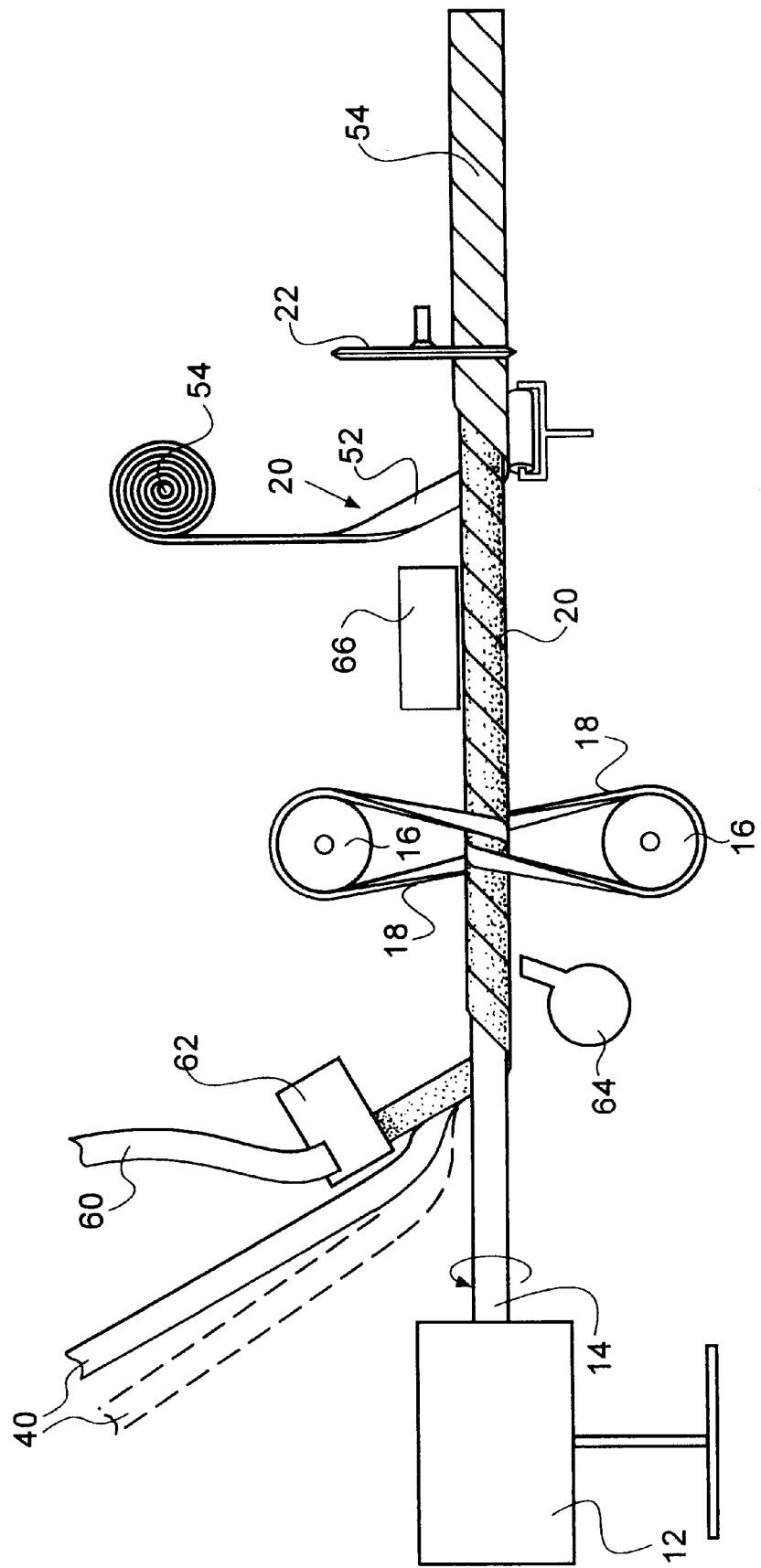
FIG. 5 is a side elevational view of a specific alternate embodiment of a device for making paint rollers particularly showing a cooling device and an additional heating device for use with strips of thermoplastic material.

Referring now to FIG. 5, a specific alternate embodiment is shown where like reference numerals are used to denote like structures. In this embodiment, a cooling device 64 is preferably used to partially cool the hot strip of thermoplastic material 60 after it is initially wound on the mandril 14, but before it contacts the belts 18. Again, multiple strips of base material 40 and multiple strips of thermoplastic material 60 (with corresponding heating unit 62) may be used.

This facilitates easier rotation of the belts 18 and assists in eliminating air bubbles that may become trapped between the layer of base material 40 and the strip of thermoplastic material 60. The cooling device 64 may be a commercially available cooling device that preferably uses forced air or cooled air to cool the thermoplastic material. Alternately, the cooling device 64 may use, for example, chilled water or a water mist to cool the thermoplastic material. Any suitable cooling method may be used. Because the thermoplastic material has been cooled prior to contact with the belts 18, the thermoplastic material may be applied to one or both sides of the strip of base material 40 without causing build up of plastic on the belts 18. A second heating device 66 is placed along the mandril 14 at a point just prior to where the fabric material 52 is applied to partially re-melts the thermoplastic material so that it again becomes tacky. The fabric material 52 then bonds to it forming the finished paint roller 54.

Figure 6:
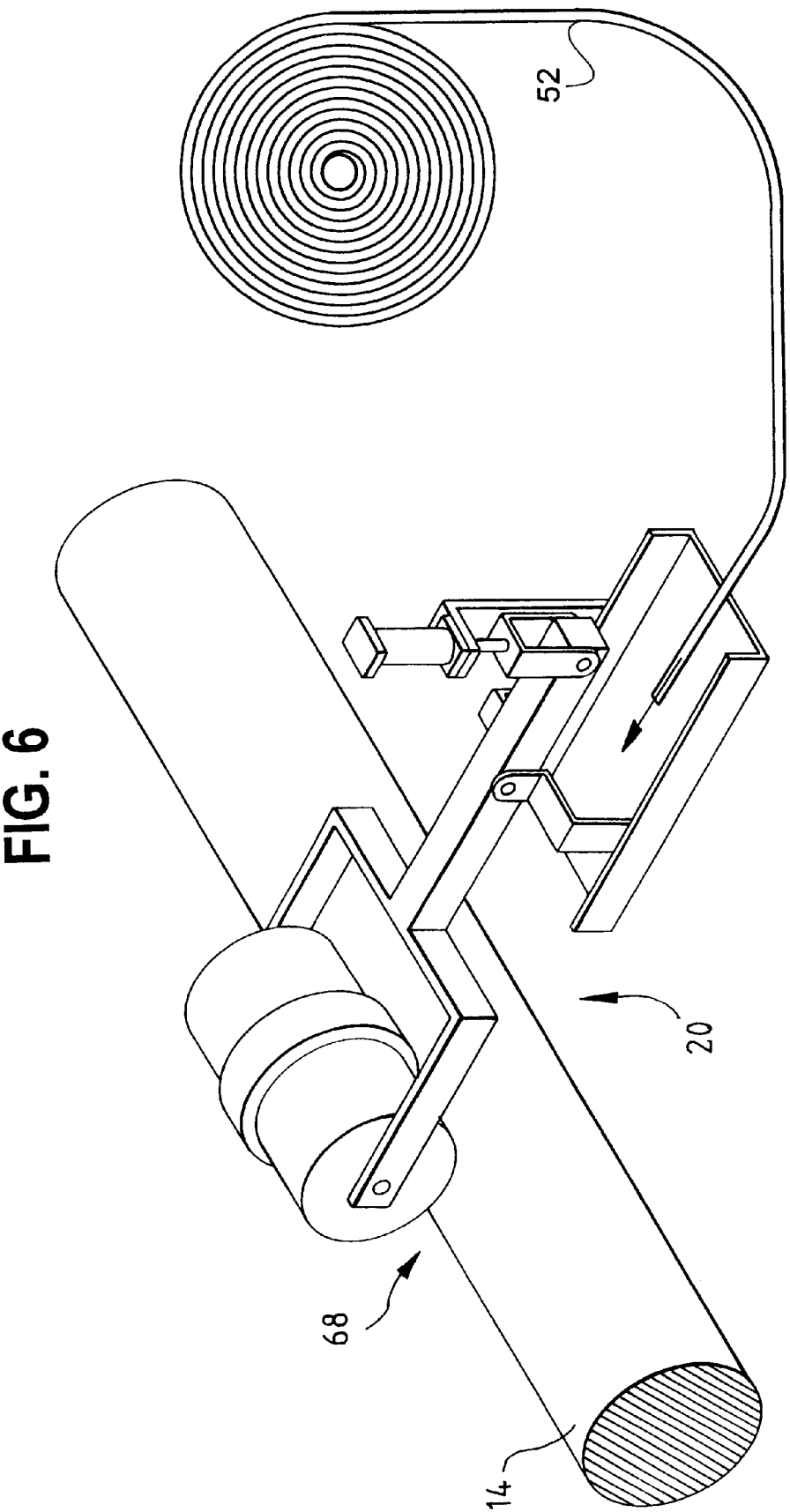
FIG. 6 is a perspective view of a push roller.

A push roller 68 shown in FIG. 6 may be used to apply rolling pressure to the core 20 to further aid in bonding the materials together by pressing the fabric material 52 against the hot thermoplastic material 60. The elongated roller or wheel 68 preferably contacts the fabric material 52 after it has been applied to compress the fabric material against the hot thermoplastic material 60.

Specific embodiments of a method and apparatus for making paint rollers according to the present inventive method have been described for the purpose of illustrating the manner in which the invention may be made and used. It should be understood that implementation of other variations and modifications of the invention and its various aspects will be apparent to those skilled in the art, and that the invention is not limited by the specific embodiment described. It is therefore contemplated to cover by the present invention any and all modifications, variations, or equivalents that fall within the true spirit and scope of the basic underlying principles disclosed and claimed herein.

What is claimed is:

1. A method of manufacturing a paint roller comprising the steps of:
   providing at least two strips of non-plastic base material;
   extruding a coating of liquid thermoplastic material onto an inside surface of a first strip of the at least two strips of base material prior to winding the first strip about a mandril;
   extruding a coating of liquid thermoplastic material onto an inside surface and an outside surface of a second strip of the at least two strips of base material prior to winding the second strip about the mandril;
   winding the at least two strips of base material, after application of the liquid thermoplastic material thereto, about the mandril in a spiral manner, the liquid thermoplastic material causing the at least two strips of base material to bond forming a paint roller core; and
   winding a strip of absorbent material about the core in a spiral manner, the liquid thermoplastic material applied to the outside surface of the second strip of base material prior to winding causing the absorbent material to bond to the core forming the paint roller.

2. The method according to claim 1 wherein the non-plastic base material is cardboard or thin metal.

3. The method according to claim 1 wherein the liquid plastic material is polypropylene.

4. The method according to claim 1 wherein the absorbent material is a strip of fabric material.

5. The method according to claim 4 wherein the liquid thermoplastic material remains in a partially melted state and facilitates bonding of the fabric material to the core without application of additional liquid thermoplastic material to the core.

6. The method according to claim 1 further including three or more strips of non-plastic base material, each said strip wound about the mandril in a spiral manner.

7. A method of forming a paint roller about a stationary mandril, the paint roller advanced along the mandril by pulleys or rollers the method comprising the steps of:
   providing a plurality of non-plastic strips of base material;
   extruding a coating of liquid plastic onto at least one side of the plurality of non-plastic strips of base material prior to winding the plurality of strips about the mandril;
   the liquid plastic applied to only an inside surface of at least one strip of the plurality of strips, the liquid plastic applied at a location along the mandril before the pulleys or rollers relative to a direction of advancement of the paint roller along the mandril;
   the liquid plastic applied to at least an outside surface of at least one strip of the plurality of strips the liquid plastic applied at a location along the mandril after the pulleys or rollers relative to the direction of advancement of the paint roller along the mandril;
   winding the plurality of non-plastic strips of base material, after application of the liquid plastic thereto, about the mandril in a spiral manner, the liquid plastic causing the plurality of strips to bond forming a core; and
   winding a strip of fabric material about the core in a spiral manner, the liquid plastic material applied at the location along the mandril after the pulleys or rollers prior to winding causing the fabric material to bond to the core forming the paint roller without application of additional liquid plastic material to the core once wound.

8. The method according to claim 7 wherein the liquid plastic material is applied to a first side and a second side of at least one of the plurality of strips of non-plastic base material.

9. The method according to claim 7 wherein the non-plastic base material is cardboard or thin metal.

10. The method according to claim 7 wherein the liquid plastic material is polypropylene.

* * * * *